United States Patent
Campbell et al.

(10) Patent No.: US 6,484,409 B2
(45) Date of Patent: *Nov. 26, 2002

(54) PRUNER ATTACHMENT APPARATUS FOR A POWER TOOL

(75) Inventors: David C. Campbell, Bel Air; Angela M. Waldrop, Parkville, both of MD (US)

(73) Assignee: Black & Decker Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/557,197

(22) Filed: Apr. 21, 2000

(65) Prior Publication Data

US 2002/0059732 A1 May 23, 2002

(51) Int. Cl.$^7$ .......................... B27B 11/04; B23D 51/04
(52) U.S. Cl. ........................... 30/371; 30/92; 30/96; 30/374; 30/378
(58) Field of Search ................ 30/371, 378, 96, 30/372, 373, 374, 375, 376, 377, 92

(56) References Cited

U.S. PATENT DOCUMENTS

| 825,836 | A | * | 7/1906 | Hornquist | 30/372 |
| 2,645,011 | A | * | 7/1953 | Otis | 30/378 |
| 3,181,239 | A | * | 5/1965 | Skok | 30/378 X |
| 3,360,021 | A | * | 12/1967 | Mejia | 30/375 |
| 3,657,813 | A |   | 4/1972 | Knight | 30/373 |
| 3,755,896 | A | * | 9/1973 | Tommerup | 30/372 |
| 3,834,019 | A | * | 9/1974 | Smeltzer et al. | 30/378 X |
| 4,272,889 | A | * | 6/1981 | Scott et al. | 30/371 |
| 4,419,904 | A |   | 12/1983 | Albury | 74/44 |
| 4,437,237 | A | * | 3/1984 | Ducret | 30/378 X |
| 4,566,188 | A |   | 1/1986 | Wilson | 30/372 |
| 4,747,212 | A | * | 5/1988 | Cavdek | 30/374 X |
| 4,945,641 | A | * | 8/1990 | Miller et al. | 30/378 X |
| 4,991,298 | A |   | 2/1991 | Matre | 30/392 |
| 5,099,705 | A |   | 3/1992 | Dravnieks | 74/50 |
| 5,205,043 | A |   | 4/1993 | Batt et al. | 30/393 |
| 5,398,417 | A |   | 3/1995 | Quirijnen | 30/394 |
| 5,450,925 | A |   | 9/1995 | Smith et al. | 184/5 |
| 5,632,089 | A | * | 5/1997 | Sakamoto et al. | 30/372 X |
| 5,724,742 | A |   | 3/1998 | Grabowski | 30/392 |
| 5,806,187 | A | * | 9/1998 | Ducret | 30/371 X |
| 5,926,961 | A |   | 7/1999 | Uhl | 30/296.1 |
| 6,067,716 | A | * | 5/2000 | Carter | 30/378 X |

FOREIGN PATENT DOCUMENTS

JP          4-8420          1/1992

* cited by examiner

*Primary Examiner*—Charles Goodman
(74) *Attorney, Agent, or Firm*—Harness, Dickey & Pierce, P.L.C.

(57) ABSTRACT

A pruner attachment apparatus for a power tool having a body, a shoe extending from the body, and a saw blade interconnected to the body for reciprocating motion. The pruner attachment apparatus includes a mounting member, a hook member and a biasing mechanism. The mounting member is releasably attachable to the shoe. The hook member is carried by the mounting member for movement between a first position and a second position. The biasing mechanism biases the hook member to the second position.

17 Claims, 4 Drawing Sheets

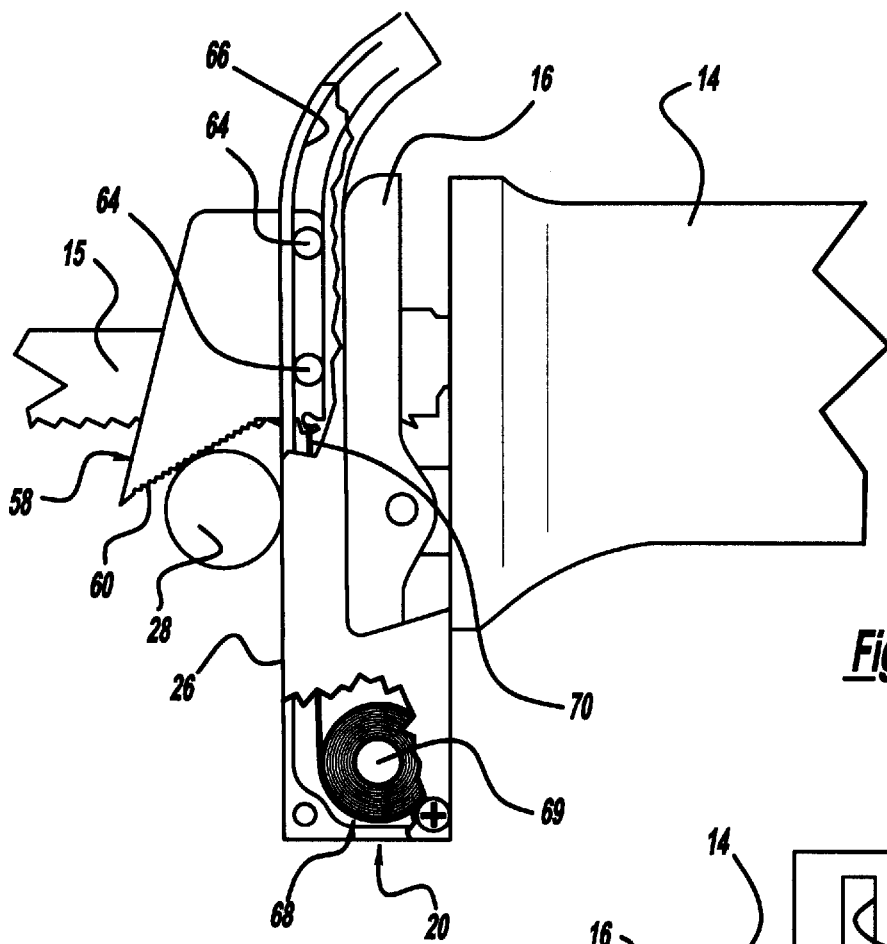
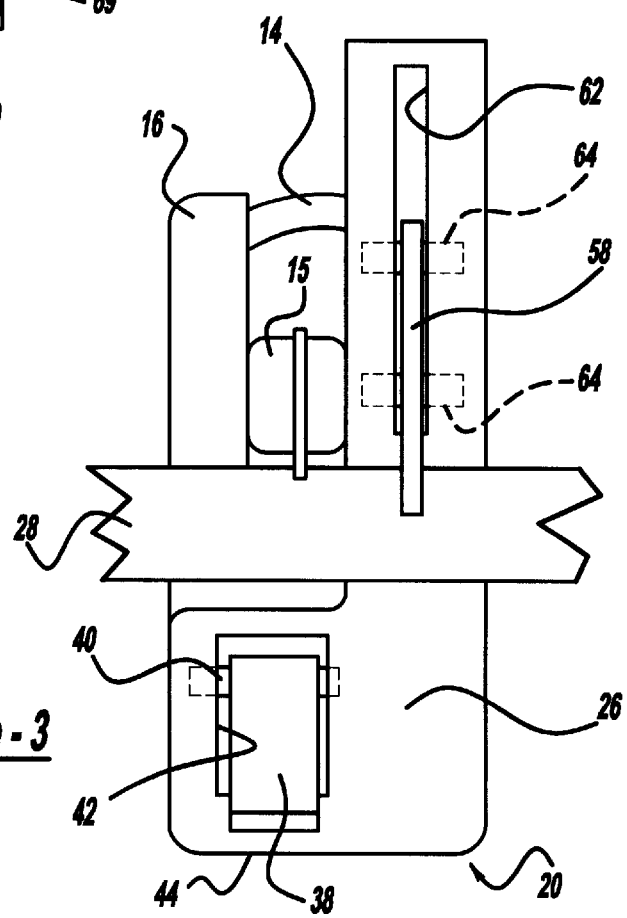
Figure - 2
Figure - 3

PRUNER ATTACHMENT APPARATUS FOR A POWER TOOL

BACKGROUND OF THE INVENTION

1. Technical Field

The present invention generally pertains to power tools. More particular, the present invention relates to a pruner attachment apparatus for a power tool. More specifically, but without restriction to the particular embodiment and/or use which is shown and described for purposes of illustration, the present invention relates to a pruner attachment apparatus attachable to a shoe of a reciprocating saw.

2. Discussion

Power reciprocating saws include jigsaws and other reciprocating saws generally referred to in the trade as "recip" saws. These saws incorporate reciprocating drive shafts for driving linear saw blades. The saw blades are driven along a predetermined path so as to provide either a rectilinear or an orbital cutting action.

Efficient cutting with a power reciprocating saw typically requires the workpiece to be secured. Otherwise, the workpiece may move relative to the saw as a result of reciprocation of the saw blade. For most applications, the workpiece can be adequately secured. However, it is not practical or perhaps possible to secure branches, smaller size tree limbs or other similarly shaped objects for cutting with a reciprocating saw.

SUMMARY OF THE INVENTION

It is a general object of the present invention to provide an attachment apparatus for a power tool for cutting branches, tree limbs and the like.

It is related object of the present invention to provide a pruner attachment apparatus which can be quickly, easily and securely attached to a power tool having a reciprocating saw blade.

In one form, the present invention provides a pruner attachment apparatus for a power tool having a body, an adjustable shoe extending from the body, and a saw blade interconnected to the body for reciprocating motion. The pruner attachment apparatus includes a mounting member, a hook member and a biasing mechanism. The mounting member is attachable to the shoe. The hook member is carried by the mounting member for movement between a first position and a second position. The biasing mechanism biases the hook member to the second position.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 2 is right side view of the pruner attachment apparatus and a portion of the power tool of FIG. 1 operatively associated with a tree branch, the pruner attachment apparatus shown partially cut-away.

FIG. 3 is a front view of the pruner attachment apparatus and a power tool of FIG. 1 shown operatively associated with a tree branch.

DETAILED DESCRIPTION OF THE PREFERRED EMBODIMENT

Figure 1:
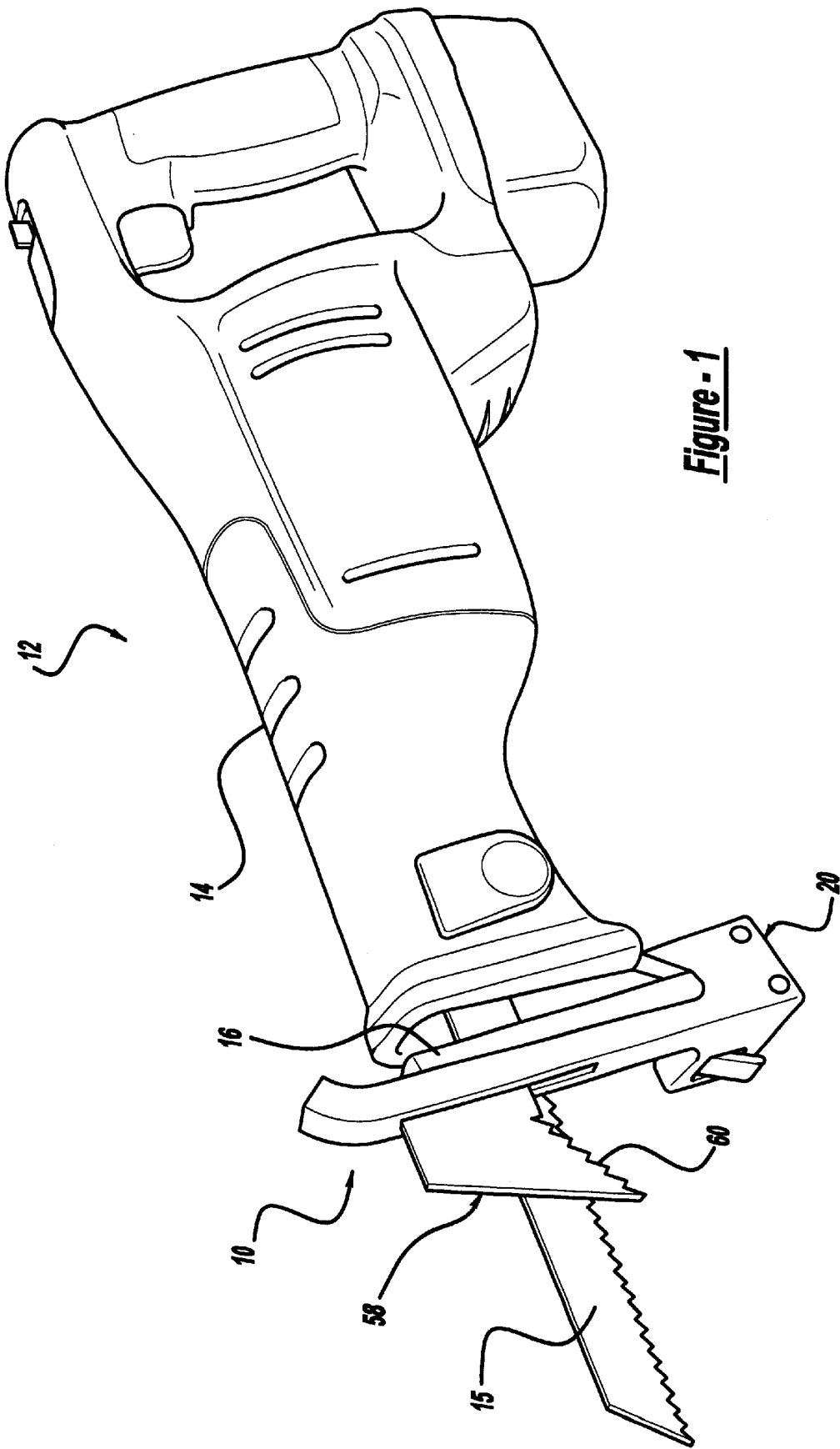
FIG. 1 is an environmental view illustrating a pruner attachment apparatus constructed in accordance with the teachings of a preferred embodiment of the present invention, the pruner attachment apparatus shown operatively attached to a power tool having a reciprocating saw blade.

With reference to the drawings, a pruner attachment apparatus constructed in accordance with the teachings of a preferred embodiment of the present invention is illustrated and generally identified at reference numeral 10. The pruner attachment apparatus is shown throughout the drawings operatively associated with a power tool 12. In the exemplary embodiment, the power tool 12 is a reciprocating saw. However, it will become apparent to those skilled in the art that the subject invention may be adapted for use with other types of tools having reciprocating saw blades.

The power tool 12 conventionally includes a body 14 and a saw blade 15 interconnected to the body 14 for reciprocating motion. The power tool 12 further includes a shoe 16. The shoe 16 is adapted to normally engage a workpiece when the power tool 12 is used without the pruner attachment apparatus 10 and is pivotally interconnected to the body 14 through a pair of mounting brackets 18.

The apparatus 10 of the present invention is illustrated to generally include a mounting member or frame 20. The frame 20 is attachable to the shoe 16 of the power tool 12. In the preferred embodiment, the frame 20 is releasably attachable to the shoe 16. In one application, the frame 20 is unitarily constructed of an injection molded plastic. However, those skilled in the art will readily appreciate that other materials may be alternatively used.

Figures 4, 5:
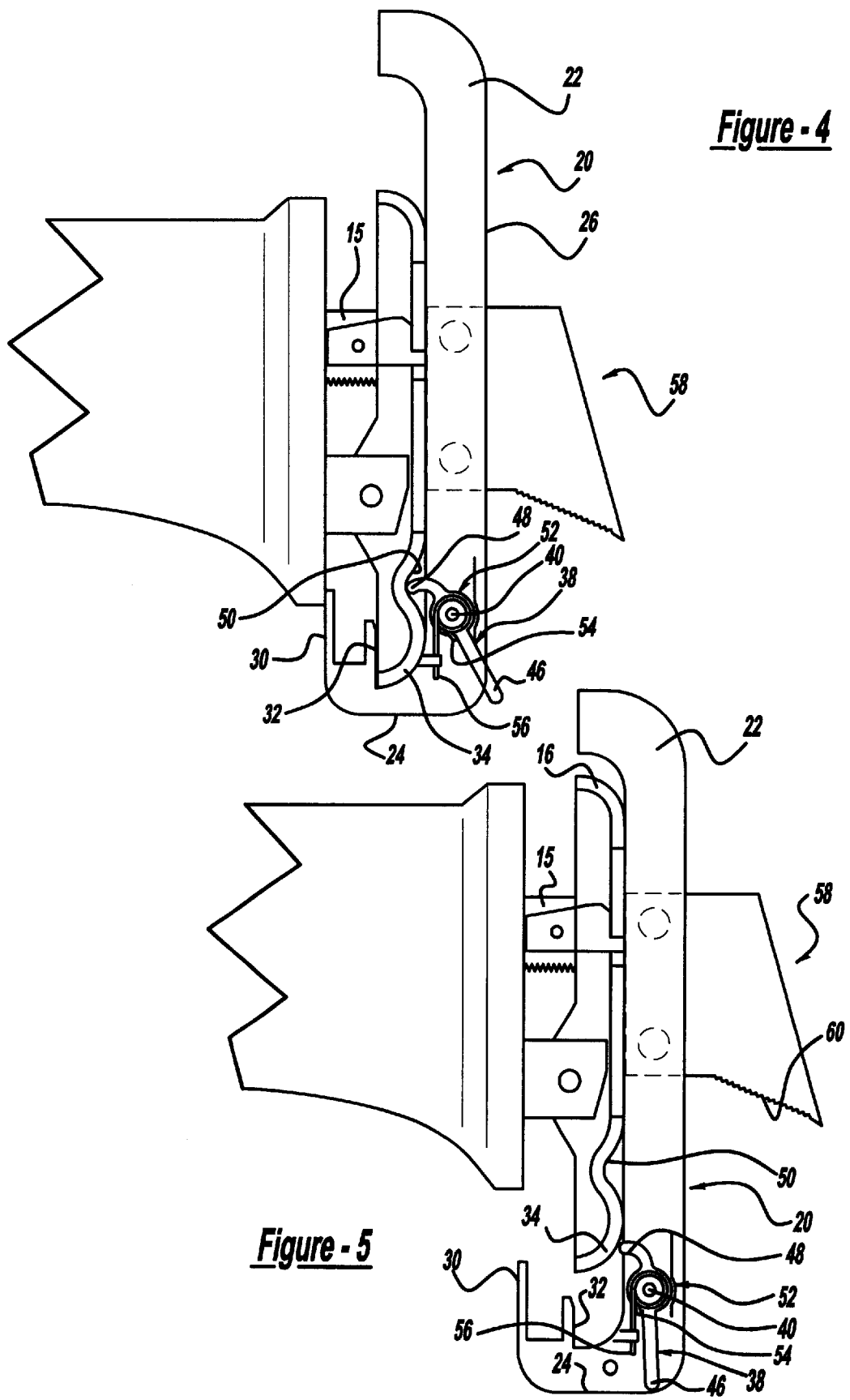
FIG. 4 is left side view of the pruner attachment apparatus and a portion of the power tool of FIG. 1 shown partially cut-away.
FIG. 5 is a view similar to FIG. 4, illustrating the pruner attachment apparatus prior to complete attachment to the shoe of the power tool.

As shown most particularly in the side views of FIGS. 4 and 5, the frame 20 includes a main body portion 22 and a rearwardly extending portion 24. The main body portion 22 includes a front face 26 for engaging a workpiece 28. In the FIGS. 2 and 3, the workpiece 28 is illustrated as a branch, small tree limb or the like. The apparatus 10 of the present invention may also assist in the cutting of small pieces of lumber, pvc tubing, metal pipe and any other similarly sized items of a material suitable for cutting with a reciprocating saw blade.

The rearwardly extending portion 24 includes a flange 30 which extends parallel to main body portion 22. The flange 30 cooperates with the main body portion 22 to define an opening 32 for receiving a lower portion 34 of the shoe 16. The flange 30 is insertable between the body 14 of the power tool 12 and the shoe 16 to prevent movement of the shoe 16 relative to the body 14.

The apparatus of the present invention 10 includes a lever 38 for securing the apparatus 10 to the shoe 16. The lever 38 is shown particularly in FIGS. 4 and 5 to be mounted for rotation about a pivot pin 40. The pivot pin 40 is carried by the frame 20 and is oriented generally perpendicular to an axis defined by the saw blade 15. The lever 38 is substantially disposed within an opening 42 defined in a laterally extending portion 44 of the frame 20.

Figure 6:
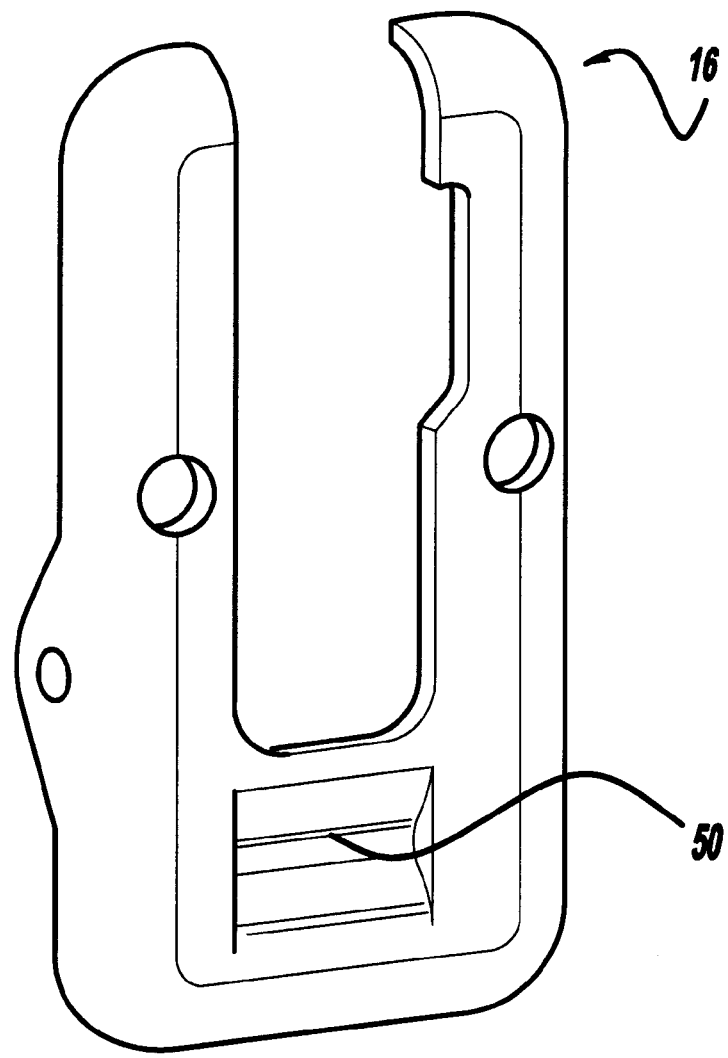
FIG. 6 is a perspective view of a shoe of the power tool illustrated in FIG. 1.

The lever 38 includes a lower end 46 and an upper end 48. The lower end 46 is adapted to be manually engaged. The upper end 48 inwardly curves and engages a pocket 50 provided in the shoe 16. The pocket 50 is shown most particularly in FIG. 6.

In the preferred embodiment, the lever 38 is biased in a counterclockwise direction (as shown in FIGS. 4 and 5). In one application, the lever 38 is biased by a torsion spring 52 which wraps around the pivot pin 40. One end 54 of the torsion spring 52 engages the lever 38 and the other end 56 is opposed by the main body portion 22 of the frame 20.

During attachment of the apparatus 10, the frame 20 is slid upwardly over the shoe 16. The spring-loaded lever 38 slides over the forward-lower surface of the shoe 16 until the upper end 48 or hook portion reaches and engages the pocket 50. Upon reaching the pocket 50, the lever 38 rotates counter-clockwise to thereby securing the frame 20 to the shoe 16.

The apparatus 10 of the present invention is shown to further include a hook member 58 having a plurality of teeth 60 for engaging the workpiece 28 and securing the workpiece 28 relative to the front face 26. In the preferred embodiment, the hook member 58 is disposed within a vertically extending slot 62 in the frame 20. The hook member 58 is interconnected to the frame 20 by a pair of pins 64 which ride in a substantially vertical channel 66 formed in the frame 20. The hook member 58 is permitted to move between a first or upper position and a second or lower position. The upper position of the hook member 58 is shown in FIG. 1. The lower position of the hook member 58 is shown in FIGS. 2 and 3, for example.

In the preferred embodiment, the hook member 58 is normally biased to its lower position. In one application, the hook member 58 is downwardly biased by a clock spring 68. The clock spring 68 is shown wound around a post 69 carried by the frame 20 and includes a free end 70 engaged with the hook member 58. Downward biasing of the hook member 58 allows the hook member 58 to restrain workpieces 28 of different sizes, and also allows the hook member 58 to move upwardly and out of the way during the cutting motion as the saw blade 15 moves downwardly through the workpiece 28.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A pruner attachment apparatus for a power tool having a body, a shoe extending from the body, and a saw blade interconnected to the body for reciprocating motion, the pruner attachment apparatus comprising:
    a frame attachable to the shoe, the frame defining a vertically extending slot;
    a hook member carried by the frame for movement between a first position and a second position the hook member translatable along the slot from the first position to the second position upon concurrent advancement of the saw blade through a workpiece; and
    a biasing mechanism biasing the hook member to the first position, the biasing mechanism completely concealed within an interior of the frame.

2. The pruner attachment apparatus for a power tool of claim 1, wherein the biasing mechanism is a clock spring.

3. The pruner attachment apparatus for a power tool of claim 1, wherein the frame defines a pair of channels and wherein the hook member is slidably interconnected to the frame by at least one pin riding in the pair of channels.

4. The pruner attachment apparatus for a power tool of claim 3, wherein the at least one pin includes a pair of pins extending substantially perpendicular to a longitudinal axis of the saw blade.

5. The pruner attachment apparatus for a power tool of claim 1, wherein the biasing mechanism biases the hook member downward.

6. A power tool comprising:
    a body;
    a shoe extending from the body;
    a saw blade interconnected to the body for reciprocating motion; and
    a pruner attachment, the pruner attachment comprising:
        a frame releasably attached to the shoe;
        a hook member carried by the frame for movement between a first position and a second position, the hook member translatable from the first position to the second position upon concurrent advancement of the saw blade through a workpiece, the hook member being laterally spaced from the blade; and
        a lever carried by the frame, the lever movable between a first position for securing the frame to the shoe and a second position for permitting removal of the frame from the shoe.

7. The power tool of claim 6, further comprising a biasing mechanism biasing the hook member to the second position.

8. The power tool of claim 6, wherein the frame defines an opening slidably receiving a portion of the shoe.

9. The power tool of claim 6, wherein the frame includes a main body portion for engaging the workpiece and a rearwardly extending portion having a flange generally parallel to the main body portion, the flange and main body portion defining an opening receiving a portion of the shoe.

10. The power tool of claim 6, further comprising a biasing mechanism for biasing the lever to the first position.

11. The power tool of claim 6, wherein the shoe defines a pocket for receiving an end of the lever when the lever is in the first position.

12. A pruner attachment apparatus for a power tool having a body, a shoe extending from the body, and a saw blade interconnected to the body for reciprocating motion, the pruner attachment apparatus comprising:
    a frame attachable to the shoe; and
    a hook member carried by the frame for movement along a path between a first position and a second position, the path including a curvilinear portion, the hook member translatable from the first position to the second position upon concurrent advancement of the saw blade through a workpiece;
    wherein the frame defines a pair of channels and wherein the hook member is slidably interconnected to the frame by at least one pin riding in the pair of channels.

13. The pruner attachment of claim 12, further comprising a biasing mechanism biasing the hook member to the first position.

14. The pruner attachment of claim 12, wherein the at least one pin includes a pair of pins extending substantially perpendicular to a longitudinal axis of the saw blade.

15. The pruner attachment of claim 12, wherein the frame defines an opening for slidably receiving a portion of the shoe.

16. The pruner attachment of claim 12, wherein the frame includes main body portion for engaging the workpiece and a rearwardly extending portion having a flange generally parallel to the main body portion, the flange and main body portion defining an opening for receiving a portion of the shoe.

17. The pruner attachment of claim 12, further comprising a lever carried by the frame, the lever movable between a first position for securing the frame to the shoe and a second position for permitting removal of the frame from the shoe.

* * * * *